(12) United States Patent
Shinohara et al.

(10) Patent No.: US 11,318,683 B2
(45) Date of Patent: May 3, 2022

(54) CONNECTION STRUCTURE OF RESIN TUBE AND RESIN JOINT AND CONNECTION METHOD THEREOF

(71) Applicant: Sumitomo Riko Company Limited, Aichi (JP)

(72) Inventors: Hideki Shinohara, Aichi (JP); Takahiro Nishiyama, Aichi (JP); Ayaka Osawa, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 17/113,123

(22) Filed: Dec. 7, 2020

(65) Prior Publication Data

US 2021/0178703 A1 Jun. 17, 2021

(30) Foreign Application Priority Data

Dec. 13, 2019 (JP) .............................. JP2019-225028

(51) Int. Cl.
  *F16L 13/02* (2006.01)
  *F16L 21/00* (2006.01)
  (Continued)

(52) U.S. Cl.
  CPC ...... *B29C 65/1635* (2013.01); *B29C 66/5221* (2013.01); *B32B 1/08* (2013.01);
  (Continued)

(58) Field of Classification Search
  CPC ....... F16L 25/0081; F16L 25/06; F16L 33/22; F16L 33/221; F16L 33/222; F16L 33/227;
  (Continued)

(56) References Cited

U.S. PATENT DOCUMENTS

| | | | | |
|---|---|---|---|---|
| 4,089,351 A | * | 5/1978 | Ward | F16L 13/02 138/109 |
| 5,636,875 A | * | 6/1997 | Wasser | F16L 47/02 285/332 |

(Continued)

FOREIGN PATENT DOCUMENTS

| | | |
|---|---|---|
| JP | H05196187 | 8/1993 |
| JP | 2005172088 | 6/2005 |

(Continued)

*Primary Examiner* — Lee E Sanderson
*Assistant Examiner* — Michael C Romanowski
(74) *Attorney, Agent, or Firm* — JCIPRNET (57) ABSTRACT

A resin joint 20 includes an outer cylinder 21 molded by a resin material capable of transmitting laser light and an inner cylinder 22 disposed facing the inner peripheral surface of the outer cylinder 21. An annular protrusion 22*b* that protrudes in the radial direction and extends in the circumferential direction is formed on the inner peripheral surface of the outer cylinder 21 or the outer peripheral surface of the inner cylinder 22. The axial end of the resin tube 10 is inserted into an annular space 30 and is deformed in the radial direction following the annular protrusion 22*b*, and a region deformed in the radial direction has a surface that is in contact with the inner peripheral surface of the outer cylinder 21. The inner peripheral surface of the outer cylinder 21 and the outer peripheral surface of the resin tube 10 are laser-welded.

9 Claims, 2 Drawing Sheets

(51) Int. Cl.
*F16L 47/02* (2006.01)
*B29C 65/00* (2006.01)
*B29C 65/16* (2006.01)
*B32B 1/08* (2006.01)
*B32B 3/30* (2006.01)
*B32B 7/04* (2019.01)
*F16L 25/06* (2006.01)
*F16L 47/20* (2006.01)
*B29L 23/00* (2006.01)

(52) U.S. Cl.
CPC .................. *B32B 3/30* (2013.01); *B32B 7/04* (2013.01); *F16L 13/02* (2013.01); *F16L 25/06* (2013.01); *F16L 47/02* (2013.01); *F16L 47/20* (2013.01); *B29L 2023/22* (2013.01)

(58) Field of Classification Search
CPC . F16L 33/34; F16L 47/02; F16L 47/20; F16L 13/02; F16L 13/0209; B32B 1/08; B32B 7/04; B32B 3/30
USPC ................. 285/285.1–296.1; 428/34.1–36.92
See application file for complete search history.

(56) References Cited

U.S. PATENT DOCUMENTS

| | | | | |
|---|---|---|---|---|
| 6,199,916 | B1* | 3/2001 | Klinger | B29C 66/52291 285/55 |
| 6,832,785 | B1* | 12/2004 | Zitkovic, Jr. | B29C 66/52296 285/285.1 |
| 6,902,208 | B1* | 6/2005 | Mobley | B29C 66/12441 285/423 |
| 7,806,444 | B2* | 10/2010 | Blivet | F16L 47/02 285/288.1 |
| 2001/0002756 | A1* | 6/2001 | Baerts | H01R 13/533 285/47 |
| 2004/0140668 | A1* | 7/2004 | Monsheimer | B29C 65/1635 285/256 |
| 2005/0062282 | A1* | 3/2005 | Rosch | F16L 13/10 285/285.1 |
| 2006/0208485 | A1* | 9/2006 | Discher | F16L 37/0985 285/903 |
| 2006/0249213 | A1* | 11/2006 | Stieler | F16L 9/147 138/109 |
| 2007/0200342 | A1* | 8/2007 | Roberts-Moore | B29C 66/72321 285/423 |
| 2008/0028592 | A1* | 2/2008 | Stieler | B29C 66/5229 29/447 |
| 2009/0261580 | A1* | 10/2009 | Zakrzewski | F16L 47/12 285/258 |
| 2009/0308479 | A1* | 12/2009 | Krauss | F16L 11/15 138/121 |
| 2014/0332155 | A1* | 11/2014 | Barthel | B29C 65/3604 156/272.4 |
| 2015/0292664 | A1* | 10/2015 | Mann | B23K 26/20 156/308.2 |
| 2019/0040980 | A1* | 2/2019 | Bearer | F16L 19/07 |
| 2020/0240561 | A1* | 7/2020 | Tan | F16L 27/111 |

FOREIGN PATENT DOCUMENTS

| | | |
|---|---|---|
| JP | 2009018576 | 1/2009 |
| JP | 2015202685 | 11/2015 |
| JP | 2017532506 | 11/2017 |

* cited by examiner

CONNECTION STRUCTURE OF RESIN TUBE AND RESIN JOINT AND CONNECTION METHOD THEREOF

CROSS-REFERENCE TO RELATED APPLICATIONS

This application claims the priority benefit of Japan Patent Application No. 2019-225028, filed on Dec. 13, 2019. The entirety of the above-mentioned patent application is hereby incorporated by reference herein and made a part of this specification.

BACKGROUND

Technical Field

The disclosure relates to a connection structure and a connection method of a resin tube and a resin joint.

Related Art

Patent literature 1 discloses that a resin tube (same meaning as a resin piping) and a resin joint (including a nipple) are laser-welded. In FIG. 1 of patent literature 1, a configuration is illustrated in which an outer peripheral surface of the resin joint and an inner peripheral surface of the resin tube are laser-welded. In FIG. 2, a configuration is illustrated in which an inner peripheral surface of the resin joint and an outer peripheral surface of the resin tube are laser-welded. In FIG. 3, a configuration is illustrated in which convex portions on the uneven outer peripheral surface of the resin joint and the inner peripheral surface of the resin tube are laser-welded. In FIG. 4, a configuration is illustrated in which convex surfaces on the uneven inner peripheral surface of the resin joint and the outer peripheral surface of the resin tube are laser-welded.

Patent literature 2 also discloses that a resin tube and a resin product are laser-welded. Patent literature 3 discloses that an outer peripheral surface of a resin tube and an inner peripheral surface of a resin product are laser-welded or friction-welded. Patent literature 4 discloses that a resin tube and a resin product are spin-welded. Patent literature 5 discloses that a synthetic resin tube having a metal layer or a magnetic layer capable of induction heating and a joint of a thermoplastic synthetic resin are fused by causing the induction heating layer of the synthetic resin tube to generate heat.

[Patent literature 1] Japanese Patent Laid-open No. 2005-172088

[Patent literature 2] Japanese Patent Laid-open No. 2009-018576

[Patent literature 3] Japanese National Publication of International Patent Application No. 2017-532506

[Patent literature 4] Japanese Patent Laid-open No. 2015-202685

[Patent literature 5] Japanese Patent Laid-open No. 5-196187

Here, in spin welding, two members to be welded are required to be relatively rotated. Because a resin tube has a length, the resin tube is not easy to rotate during spin welding. On the other hand, generally, the resin joint may be rotated during spin welding as a simple substance. However, when the resin joint is attached to another member, the resin joint is not easy to rotate during spin welding. Therefore, there is a case in which spin welding is not easy to apply.

On the other hand, since laser welding does not require relative rotation like spin welding, the laser welding has a high degree of freedom. Here, in order to secure high joining strength by the laser welding, it is important that two members to be joined are in contact with each other before laser irradiation. Therefore, by forming an annular protrusion on a resin joint, a resin tube is deformed following the annular protrusion of the resin joint, and thereby the two members can be brought into contact with each other in the region of the protrusion.

Here, the resin joint is molded by a hard resin harder than the resin tube. Therefore, when the resin tube is fitted into the resin joint, the resin joint does not deform, but the resin tube is deformed.

Besides, when an annular protrusion protruding inward in the radial direction is formed on an inner peripheral surface of the resin joint, by inserting the resin tube into the inner peripheral surface of the resin joint, the resin tube is deformed inward in the radial direction following the annular protrusion. Here, if a rubber tube is inserted into an inner peripheral side of the resin joint, due to an elastic force of the rubber tube, the rubber tube is reduced in diameter following the annular protrusion, and furthermore, the site of the rubber tube passing through the annular protrusion can be expanded in diameter and restored.

However, the resin tube is harder than the rubber (has high rigidity). Thus, if the resin tube is inserted into the inner peripheral surface of the resin joint and the resin tube passes through the annular protrusion, there is a possibility that the resin tube may not be reduced in diameter uniformly in the entire circumferential direction following the annular protrusion and a part of the resin tube in the circumferential direction may be deformed into a concave shape (buckling in the circumferential direction). In this state, because the two members are not in contact with each other over the entire circumference in the circumferential direction, there is a possibility that the joining strength by the laser welding cannot be secured sufficiently.

On the other hand, when the resin tube is fitted on an outer peripheral surface of the resin joint, the resin tube can be brought into contact with the outer peripheral surface of the resin joint over the entire circumference in the circumferential direction by expanding in diameter and deforming. However, in order to perform the laser welding, a member on the outer periphery side of a welding site is required to be molded by a material that transmits laser light. That is, in this case, the resin tube is molded by the material that transmits laser light.

However, because the resin tube is required to have various functions, the resin tube may have, for example, a multi-layer structure. In this case, the resin tube is limited to the material that transmits laser light, and thus there is a case in which the resin tube cannot be applied as a resin tube that has desirable functions. Therefore, the material of the resin tube is desirably not limited to the material that transmits laser light.

The disclosure provides a connection structure and a connection method of a resin tube and a resin joint in which the resin tube is not limited to a material that transmits laser light and laser welding regions of the resin tube and the resin joint are reliably brought into contact with each other.

SUMMARY (1. Connection Structure of Resin Tube and Resin Joint)

The resin joint that configures the connection structure includes an outer cylinder molded by a resin material capable of transmitting laser light, and an inner cylinder that is disposed facing an inner peripheral surface of the outer cylinder and forms an annular space having an opening in one side in an axial direction between the inner peripheral surface of the outer cylinder and the inner cylinder. An annular protrusion that protrudes in a radial direction and extends in a circumferential direction is formed on the inner peripheral surface of the outer cylinder or an outer peripheral surface of the inner cylinder.

The axial end of the resin tube that configures the connection structure is molded by a resin material capable of absorbing laser light. The axial end of the resin tube is inserted into the annular space and is deformed in the radial direction following the annular protrusion, and a region deformed in the radial direction has a surface that is in contact with the inner peripheral surface of the outer cylinder. The inner peripheral surface of the outer cylinder and a surface in the resin tube that is in contact with the inner peripheral surface of the outer cylinder are laser-welded.

The axial end of the resin tube is inserted into the annular space of the resin joint. The annular protrusion is formed on the outer cylinder or the inner cylinder forming the annular space. In the state of being inserted into the annular space, the axial end of the resin tube is deformed in the radial direction following the annular protrusions. Here, when the annular protrusion is formed on the inner peripheral surface of the outer cylinder, the outer peripheral surface of the inner cylinder that is a surface facing the annular protrusion acts as a support surface for restricting concave deformation caused by a part of the resin tube in the circumferential direction (buckling in the circumferential direction). When an annular protrusion is formed on the outer peripheral surface of the inner cylinder, the inner peripheral surface of the outer cylinder that is a surface facing the annular protrusion acts as a support surface for restricting concave deformation caused by a part of the resin tube in the circumferential direction (buckling in the circumferential direction).

(2. Connection Method of Resin Tube and Resin Joint)

The resin joint includes an outer cylinder molded by a resin material capable of transmitting laser light, and an inner cylinder that is disposed oppositely to the inner peripheral surface of the outer cylinder and forms an annular space having an opening in one side in an axial direction between the inner peripheral surface of the outer cylinder and the inner cylinder. An annular protrusion that protrudes in the radial direction and extends in the circumferential direction is formed on the inner peripheral surface of the outer cylinder or the outer peripheral surface of the inner cylinder. The axial end of the resin tube is molded by a resin material capable of absorbing laser light.

In the connection method, the axial end of the resin tube is inserted into the annular space and is deformed in the radial direction by the annular protrusion, and a region deformed in the radial direction has a surface that is in contact with the inner peripheral surface of the outer cylinder. Furthermore, in the connection method, the inner peripheral surface of the outer cylinder and the surface that is in contact with the inner peripheral surface of the outer cylinder in the resin tube are laser-welded by irradiating laser light toward the contact surface.

DESCRIPTION OF THE EMBODIMENTS

Therefore, in one embodiment of connection structure of resin tube and resin joint in this disclosure, the region deformed in the radial direction by the annular protrusion in the resin tube is compressed in the radial direction over the entire circumference by the annular protrusion in the resin joint and the facing surface thereof. As a result, the region deformed in the radial direction in the resin tube has a surface in contact with the inner peripheral surface of the outer cylinder over the entire circumference. In particular, since the resin tube is compressed in the radial direction by the annular protrusion in the resin joint and the facing surface thereof, the resin tube is reliably in contact with the inner peripheral surface of the outer cylinder over the entire circumference. Besides, the inner peripheral surface of the outer cylinder and the surface that is in contact with the inner peripheral surface of the cylinder in the resin tube are laser-welded. Therefore, the joining strength by the laser welding can be sufficiently secured.

In addition, the outer cylinder of the resin joint is molded by a resin material capable of transmitting laser light, and the resin tube is molded by a resin material capable of absorbing laser light. Therefore, the resin tube is not limited to the material that transmits laser light, and thus, the resin tube can have various functions.

In one embodiment of the connection method of resin tube and resin joint in this disclosure, by the connection method, the joining strength by laser welding can be sufficiently secured as in the connection structure described above. In addition, the resin tube is not limited to the material that transmits laser light, and thus the resin tube can have various functions.

1. Application Targets

Application targets of a connection structure of a resin tube and a resin joint are, for example, flow paths for circulating various kinds of fluids, such as automotive components, industrial machinery components, medical equipment components and the like. The fluid to be circulated may be liquid or gas.

For example, as an example of the automotive components, the connection structure can be applied to a flow path for circulating liquid fuel, fuel vapour, or the like. When the fluid is gasoline as an example of fuel, the connection structure is applied to a fuel supply line from a filler neck to an internal combustion engine. For example, when the connection structure is applied to a fuel supply line connecting a fuel tank and an internal combustion engine, one end of the resin tube is attached to a pump which is attached to the fuel tank, the resin joint is attached to a fuel delivery pipe for distributing and supplying the fuel to an injector of the internal combustion engine, and the other end of the resin tube is connected to the resin joint.

In addition, in the fuel supply line, the connection structure can also be applied to connect the resin joint configuring a part of the filler neck and the resin tube connecting the filler neck and the fuel tank. In addition, the connection structure of the resin tube and the resin joint can also be applied in the middle of the fuel supply line connecting the filler neck and the fuel tank.

As an example of the automotive components, the connection structure is not limited to the fuel supply line and can also be applied to a piping of coolant, a refrigerant piping of an air conditioner, an exhaust gas piping, or the like. In addition to the automotive components, the connection structure can also be applied to a flow path for circulating various kinds of fluids such as a cooling liquid (oil, water, or the like) in industrial machines. The connection structure can also be applied to a flow path for circulating a medical fluid in medical equipment. In the following, the connection structure is described using a fuel supply line in an automobile as an example.

2. Configuration of Resin Tube 10

Figure 1:
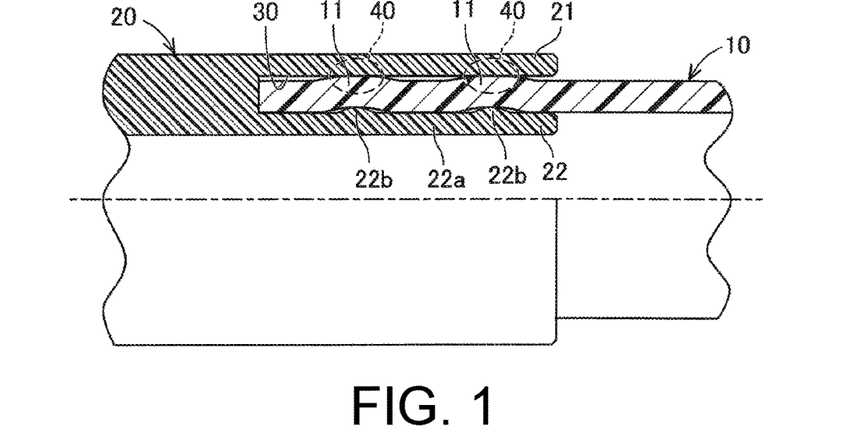
FIG. 1 is a diagram showing a connection structure of a first embodiment, in which the upper half shows an axial cross-section view and the lower half shows a view seen from the outside.

A resin tube 10 is described with reference to FIG. 1. The resin tube 10 is molded by a resin, for example, a thermoplastic resin. The resin tube 10 is a pipe (piping) formed into an elongated shape. At least an axial end of the resin tube 10 is formed into a tubular shape. The axial end of the resin tube 10 is formed into, for example, a cylindrical shape. However, the axial end of the resin tube 10 is not limited to a cylindrical shape and may be formed into a non-cylindrical shape such as an elliptical cylinder shape or a square cylinder shape.

That is, the axial end of the resin tube 10 has an inner peripheral surface and an outer peripheral surface having a circle shape, an ellipse shape, a polygonal shape, or the like in a cross-section perpendicular to the axis. In addition, the outer peripheral surface and the inner peripheral surface of the axial end of the resin tube 10 may be formed into a linear shape parallel to an axial direction in an axial cross-section. Therefore, a thickness of the resin tube 10 is constant in the axial direction. However, at least one of the outer peripheral surface and the inner peripheral surface may be formed into a slightly tapered shape in the axial cross-section.

The axial end of the resin tube 10 is formed of a material and into a shape so as to be more easily deformed than a resin joint 20. That is, the axial end of the resin tube 10 is molded to have lower rigidity with respect to the resin joint 20.

In addition, the resin tube 10 is molded by, for example, extrusion molding. Moreover, the resin tube 10 may be molded by various molding methods not limited to extrusion molding, such as blow molding or the like. When the resin tube 10 is molded by the extrusion molding, the resin tube 10 is molded by a homogeneous layer structure over the entire length in a longitudinal direction.

When applied to a fuel supply line of an automobile, the resin tube 10 is molded by a material capable of circulating liquid fuel. For example, the resin tube 10 has a multi-layer structure. In order to enable the resin tube 10 to exert various functions, different materials are appropriately applied to each layer.

For example, the resin tube 10 has a structure of three or more layers including an inner layer, an intermediate layer, and an outer layer. Since the inner layer is a surface to be exposed to liquid fuel (gasoline), a resin material having gasoline resistance is applied. For example, the inner layer applies a material mainly composed of high density polyethylene (HDPE). However, the inner layer can also use other materials as long as the other materials have the above-described performance.

The intermediate layer is disposed on an outer peripheral side of the inner layer. The intermediate layer applies, for example, a material having fuel permeation resistance. For example, the intermediate layer applies a material mainly composed of ethylene-vinyl alcohol copolymer (EVOH) and any one of polyamides (PA). However, the intermediate layer can also use other materials as long as the other materials have the above-described performance.

The outer layer is disposed on an outer peripheral side of the intermediate layer. The outer layer applies, for example, a material having impact resistance, weather resistance, and chemical resistance. For example, the outer layer applies a material mainly composed of high density polyethylene (HDPE) and any one of polyamides (PA). However, the outer layer can also use other materials as long as the other materials have the above-described performance.

Besides, the resin tube 10 is molded by a resin material capable of absorbing laser light. For example, when the resin tube 10 has a multi-layer structure as described above, at least one of the multiple layers is formed of the resin material capable of absorbing laser light. Certainly, all of the multiple layers may be molded by the resin material capable of absorbing laser light.

In general, when the material that absorbs laser light is compared with a material that transmits laser light, the material that absorbs laser light has more types. Therefore, there is practically no restriction on selecting one from resin materials capable of absorbing laser light as the resin material for exerting the function of each layer of the resin tube 10. That is, a degree of freedom in selecting the resin material is extremely high.

Here, when the resin tube 10 has a multi-layer structure, the outermost layer of the resin tube 10 may be a resin material capable of absorbing laser light. However, when a thickness of the outermost layer is thin, even if the outermost layer is capable of transmitting laser light, layers inner than the outermost layer may be a resin material capable of absorbing laser light. Moreover, the thickness of the outermost layer may be formed to an extent that heat generated in the layers inner than the outermost layer by the irradiation of the laser light described later is transferred to a surface of the outermost layer.

Moreover, although the resin tube 10 is required to have a multi-layer structure when applied to a fuel supply line of an automobile, there is a case in which the resin tube 10 is required to have a multi-layer structure depending on required functions even if the resin tube 10 is not applied to the fuel supply line of an automobile. In this application, the resin tube 10 is formed of a multi-layer structure substantially similarly to the above, even if the type of the resin material is different.

3. First Embodiment (3-1. Configuration of Resin Joint 20 of First Embodiment)

A configuration of the resin joint 20 of a first embodiment connected to the axial end of the resin tube 10 described above is described with reference to FIG. 1. The resin joint 20 may have a joint function for connecting the resin tube 10 and other members. However, the resin joint 20 is not limited to be formed as a separate body with respect to the other members, and may function as a part of the other members. That is, the resin joint 20 may be any member functioning as a connection site to the resin tube 10.

The resin joint 20 is applied as, for example, a connection site attached to a fuel delivery pipe for distributing and supplying to an injector in a fuel supply line of an automobile. In addition, the resin joint 20 may be applied as a part of the filler neck. In addition, the resin joint 20 can also be applied in the middle of a flow path for connecting the filler neck and the fuel tank, in the middle of a flow path for connecting the fuel tank and the internal combustion engine, and the like in the fuel supply line.

The resin joint 20 has a function of circulating a fluid between the resin joint 20 and the resin tube 10. Besides, the resin joint 20 includes an outer cylinder 21 and an inner cylinder 22 at the site connected to the resin tube 10. In addition to the outer cylinder 21 and the inner cylinder 22, the resin joint 20 is connected to a mating member for circulating the fluid between the resin joint 20 and the resin tube 10.

The outer cylinder 21 and the inner cylinder 22 are molded by a resin, for example, a thermoplastic resin. Moreover, in the resin joint 20, sites other than the outer cylinder 21 and the inner cylinder 22 may be molded by a resin material of the same type as the outer cylinder 21 and the inner cylinder 22, a resin material of a different type, or a material other than the resin. In addition, the outer cylinder 21 and the inner cylinder 22 have a higher rigidity than the axial end of the resin tube 10. That is, the outer cylinder 21 and the inner cylinder 22 are less likely to deform than the axial end of the resin tube 10. The outer cylinder 21 and the inner cylinder 22 may be made of a resin material which is harder than the resin material of resin tube 10.

The outer cylinder 21 and the inner cylinder 22 are disposed facing each other in the radial direction, and an annular space 30 having an opening in one side in the axial direction is formed between an inner peripheral surface of the outer cylinder 21 and an outer circumferential surface of the inner cylinder 22. The axial end of the resin tube 10 is inserted into the annular space 30.

The outer cylinder 21 and the inner cylinder 22 are specifically described below. In the example, the outer cylinder 21 and the inner cylinder 22 are molded by a resin material of the same type and configure one member formed integrally. For example, the outer cylinder 21 and the inner cylinder 22 are simultaneously molded by injection molding or the like.

The outer cylinder 21 is molded by a resin material capable of transmitting laser light. An inner peripheral surface of the outer cylinder 21 is formed into a shape substantially similar to the outer peripheral surface of the resin tube 10. Therefore, when the cross-section perpendicular to the axis of the outer peripheral surface of the tube 10 is a circle, a cross-section perpendicular to the axis of the inner peripheral surface of the outer cylinder 21 is formed into a circle. In addition, an axial cross-section shape of the inner peripheral surface of the outer cylinder 21 is formed into a linear shape parallel to the axial direction. However, on the inner peripheral surface of the outer cylinder 21, an end of the annular space 30 on the opening side forms a chamfer. That is, sites other than the chamfer on the inner peripheral surface of the outer cylinder 21 are formed into a linear shape parallel to the axial direction in the axial cross-section. In addition, an inner diameter of the inner peripheral surface the outer cylinder 21 is formed to be the same as or slightly larger than an outer diameter of the outer peripheral surface of the resin tube 10 in order that the resin tube 10 can be inserted.

An outer peripheral surface of the outer cylinder 21 can be any shape. A thickness of the outer cylinder 21 may be the same over the entire circumference, or may be different depending on the portions in the circumferential direction. In addition, the thickness of the outer cylinder 21 may be the same or may be different in the axial direction. For example, when an inner peripheral surface of the outer cylinder 21 is cylindrical, the outer peripheral surface of the outer cylinder 21 is also cylindrical. In this case, the thickness of the outer cylinder 21 is the same over the entire circumference in the circumferential direction and is the same in the axial direction.

In the example, the inner cylinder 22 is molded by a resin material of the same type as the outer cylinder 21, and thus the inner cylinder 22 is molded by the resin material capable of transmitting laser light. The inner cylinder 22 is disposed facing the inner peripheral surface of the outer cylinder 21, and the annular space 30 having an opening in the one side in the axial direction is formed between the inner cylinder 22 and the inner peripheral surface of the outer cylinder 21.

The inner cylinder 22 includes an inner cylinder body 22a and one or more annular protrusions 22b. An outer peripheral surface of the inner cylinder body 22a is formed into a shape substantially similar to the inner peripheral surface of the resin tube 10. Therefore, when the cross-section perpendicular to the axis of the inner peripheral surface of the resin tube 10 is a circle, a cross-section perpendicular to the axis of an outer peripheral surface of the inner cylinder body 22a is formed into a circle. In addition, an axial cross-section shape of the outer peripheral surface of the inner cylinder body 22a is formed into a linear shape parallel to the axial direction. However, on the outer peripheral surface of the inner cylinder body 22a, the end of the annular space 30 on the opening side forms a chamfer. That is, sites other than the chamfer on the outer peripheral surface of the inner cylinder body 22a are formed into a linear shape parallel to the axial direction in the axial cross-section.

An outer diameter of the outer peripheral surface of the inner cylinder body 22a may be the same as the inner diameter of the inner peripheral surface of the resin tube 10, or may be slightly smaller or slightly larger. When the outer diameter of the outer peripheral surface of the inner cylinder body 22a is the same as or smaller than the inner diameter of the inner peripheral surface of the resin tube 10, the inner cylinder body 22a does not cause the resin tube 10 to deform when the resin tube 10 is inserted into the annular space 30. When the outer diameter of the outer peripheral surface of the inner cylinder body 22a is larger than the inner diameter of the inner peripheral surface of the resin tube 10, the resin tube 10 is inserted into the annular space 30, and thereby the inner cylinder body 22a causes the resin tube 10 to expand in diameter and deform.

In addition, a difference between the outer diameter of the outer peripheral surface of the inner cylinder body 22a and the inner diameter of the inner peripheral surface of the outer cylinder 21 is formed to be the same as or slightly larger than the thickness of the resin tube 10. That is, the resin tube 10 can be inserted into a facing space between the outer peripheral surface of the inner cylinder body 22a and the inner peripheral surface of the outer cylinder 21 with a radial gap between the inner cylinder body 22a and the resin tube 10, and a radial gap between the outer cylinder 21 and the resin tube 10.

The annular protrusion 22b is formed on the outer peripheral surface of the inner cylinder body 22a and protrudes further outward in the radial direction than the inner cylinder body 22a. The annular protrusion 22b is formed in a manner of extending along the entire circumference of the inner cylinder body 22a in the circumferential direction. The axial cross-section shape of the annular protrusion 22b is formed into a curved convex shape, for example, an arc convex shape. The axial cross-section shape of the annular protrusion 22b is formed to be the same over the entire circumference in the circumferential direction. In addition, the radial height of the annular protrusion 22b is formed to be the same over the entire circumference in the circumferential direction.

Here, the annular protrusion 22b is formed at a position radially facing a region of the inner peripheral surface of the outer cylinder 21 which has a linear axial cross-section shape. A difference between an outer diameter of the annular protrusion 22b at a position in which the annular protrusion 22b has the maximum height and the inner diameter of the inner peripheral surface of the outer cylinder 21 is formed to be smaller than the thickness of the resin tube 10. That is, in the region where the annular protrusion 22b is formed, the resin tube 10 is in a state of being compressed and deformed in the thickness direction.

In the example, a plurality of the annular protrusions 22b is formed at different positions in the axial direction. In particular, a case in which two annular protrusions 22b are formed is exemplified. Moreover, one annular protrusion 22b may be formed at one location in the axial direction.

(3-2. Connection Structure and Connection Method of First Embodiment)

Next, a connection structure and a connection method of the resin tube 10 and the resin joint 20 described above are described with reference to FIG. 1.

The axial end of the resin tube 10 is inserted into the annular space 30 formed in the resin joint 20. Here, since the annular protrusion 22b is not formed in the vicinity of the opening of the annular space 30, first, the resin tube 10 is inserted into a radial gap formed by the outer cylinder 21 and the inner cylinder body 22a (initial insertion step). Here, the difference between the inner diameter of the inner peripheral surface of the outer cylinder 21 of the resin joint 20 and the outer diameter of the outer peripheral surface of the inner cylinder body 22a is the same as or slightly larger than the thickness of the resin tube 10. Therefore, the resin tube 10 is inserted into the vicinity of the opening of the annular space 30 without being compressed in the radially direction.

Subsequently, when the resin tube 10 is further inserted deep inside, the resin tube 10 passes through the one or more annular protrusions 22b (annular protrusion passing step). Then, a front end of the resin tube 10 in the radial direction reaches a bottom surface of the annular space 30.

Here, in the axial region where the annular protrusion 22b is formed, a target region 11 of the resin tube 10 is deformed in the radial direction following the annular protrusion 22b. The difference between the outer diameter of the annular protrusion 22b at a position in which the annular protrusion 22b has the maximum height and the inner diameter of the inner peripheral surface of the outer cylinder 21 is formed to be smaller than a reference thickness (no-load thickness) of the resin tube 10. Thus, in the axial region where the annular protrusion 22b is formed, the target region 11 of the resin tube 10 is in a state of being compressed and deformed in the thickness direction.

In addition, the region of the inner peripheral surface of the outer cylinder 21 which faces the annular protrusion 22b acts as a support surface for restricting concave deformation caused by a part of the resin tube 10 in the circumferential direction (buckling in the circumferential direction) when the resin tube 10 passes through the annular protrusion 22b. Therefore, the target region 11 deformed in the radial direction by the annular protrusion 22b in the resin tube 10 is in a state of being compressed in the radial direction over the entire circumference by the annular protrusion 22b in the resin joint 20 and the inner peripheral surface of the outer cylinder 21 which is the facing surface of the annular protrusion 22b.

As a result, the target region 11 deformed in the radial direction in the resin tube 10 has a surface that is in contact with the inner peripheral surface of the outer cylinder 21 over the entire circumference. In particular, since the target region 11 of the resin tube 10 is in a state of being compressed in the radial direction by the annular protrusion 22b and the inner peripheral surface of the outer cylinder 21 which is the facing surface of the annular protrusion 22b, the target region 11 of the resin tube 10 is reliably in contact with the inner peripheral surface of the outer cylinder 21 over the entire circumference.

Subsequently, laser light is irradiated from the outer peripheral surface of the outer cylinder 21 over the entire circumference to the surface where the inner peripheral surface of the outer cylinder 21 and an outer peripheral surface of the target region 11 of the resin tube 10 are in contact with each other in the axial region of the annular protrusion 22b (laser light irradiation step). The outer cylinder 21 is molded by a resin material capable of transmitting the laser light. On the other hand, the resin tube 10 is molded by a resin material capable of absorbing the laser light.

Therefore, the irradiated laser light passes through the outer cylinder 21 and is absorbed by the resin tube 10. Thus, heat is generated at a site where the laser light is absorbed. In the site where the laser light is absorbed, the inner peripheral surface of the outer cylinder 21 is firmly in contact with the outer peripheral surface of the target region 11 of the resin tube 10. Therefore, a contact site 40 between the inner peripheral surface of the outer cylinder 21 and the outer peripheral surface of the target region 11 of the resin tube 10 is laser-welded in the axial region of the annular protrusion 22b by the irradiation of the laser light. In this way, the connection structure of the resin tube 10 and the resin joint 20 is completed.

As described above, the inner peripheral surface of the outer cylinder 21 and the outer peripheral surface of the target region 11 of the resin tube 10 are in contact with each other in a compressed state over the entire circumference by the annular protrusion 22b, and the contact site 40 is laser-welded over the entire circumference. Therefore, in the connection structure of the resin tube 10 and the resin joint 20, the joining strength by the laser welding can be sufficiently secured.

In addition, the outer cylinder 21 of the resin joint 20 is formed of the resin material capable of transmitting the laser light, and the resin tube 10 is formed of the resin material capable of absorbing the laser light. Therefore, the resin tube 10 is not limited to the material that transmits the laser light, and thus, the resin tube 10 can have various functions.

In addition, in the example, the annular protrusion 22b is formed in the inner cylinder 22. That is, a surface pressure at the contact site between the inner peripheral surface of the resin tube 10 and the annular protrusion 22b is very high. Therefore, when a fluid flowing through the resin tube 10 and the resin joint 20 enters the annular space 30, the site having the high surface pressure has a high sealing function.

(4. Connection Structure and Connection Method of Second Embodiment)

Figure 2:
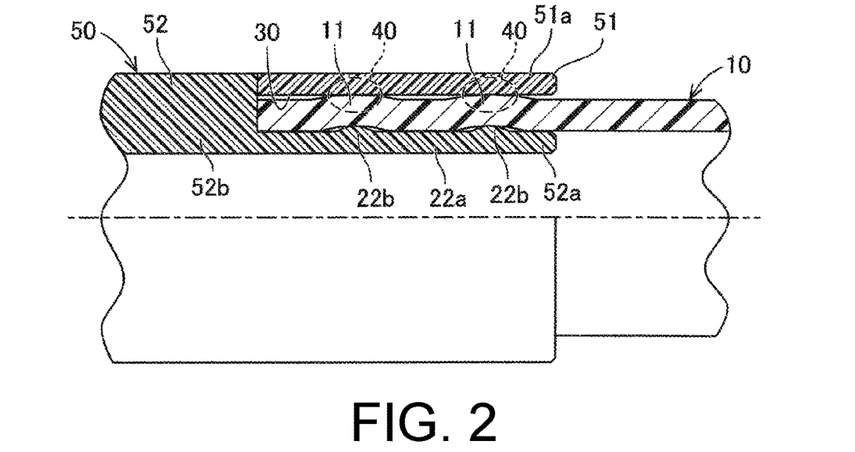
FIG. 2 is a diagram showing a connection structure of a second embodiment, in which the upper half shows an axial cross-section view and the lower half shows a view seen from the outside.

A configuration of a resin joint 50 of a second embodiment is described with reference to FIG. 2. Moreover, in the second embodiment, the same configurations as those in the first embodiment are designated by the same reference numerals and the description thereof is omitted.

The resin joint 50 includes an outer cylinder member 51 and an inner cylinder member 52. The outer cylinder member 51 and the inner cylinder member 52 in the example are separate bodies, which are formed by different materials respectively, and are joined with each other. Here, an overall shape of the resin joint 50 in the example is the same as the overall shape of the resin joint 20 in the first embodiment. Therefore, a connection structure of the resin tube 10 and the resin joint 50 is the same as that in the first embodiment. The outer cylinder member 51 and the inner cylinder member 52 which configure the resin joint 50 are described below.

The outer cylinder member 51 is molded by a resin material capable of transmitting laser light. The outer cylinder member 51 is configured to include an outer cylinder 51a. In the example, the outer cylinder member 51 is configured only by the outer cylinder 51a. Moreover, the outer cylinder 51a in the example has the same configuration as the outer cylinder 21 of the first embodiment.

The inner cylinder member 52 is molded as a separate member from the outer cylinder member 51 and is molded by a resin material different from that of the outer cylinder member 51. For example, the inner cylinder member 52 may be molded by a resin material capable of absorbing laser light, a resin material capable of transmitting laser light, or a resin material capable of partially transmitting laser light (for example, a translucent resin material). The inner cylinder member 52 includes an inner cylinder 52a and an inner cylinder base portion 52b. The inner cylinder 52a has the same configuration as the inner cylinder 22 of the first embodiment. Moreover, the inner cylinder 52a configures an inner part of the annular space 30.

The inner cylinder base portion 52b is integrally configured at an axial base end (left end in FIG. 2) of the inner cylinder 52a. The inner cylinder base portion 52b configures an axial bottom portion of the annular space 30. The inner cylinder base portion 52b is formed to be thicker than the inner cylinder 52a. A surface having a normal line in the axial direction of the inner cylinder base portion 52b (axial end surface) is in contact with and joined to the axial base end surface of the outer cylinder member 51. The inner cylinder base portion 52b and the outer cylinder member 51 are joined by various means such as spin welding, laser welding, an adhesive, and the like.

After the resin joint 50 is formed, the resin tube 10 and the resin joint 50 are connected by the same method as the connection method of the first embodiment. In this way, the connection structure of the resin tube 10 and the resin joint 50 is completed.

According to the example, the outer cylinder member 51 and the inner cylinder member 52 are separate members and are molded by different resin materials. Therefore, only the outer cylinder member 51, which is a part of the resin joint 50, may be molded by a resin material capable of transmitting laser light. Therefore, the inner cylinder member 52, which is a remaining site of the resin joint 50, is not limited to the resin material capable of transmitting laser light, and a degree of freedom in selecting the resin material is increased.

Moreover, the joining of the outer cylinder member 51 and the inner cylinder member 52 is easy because the joining can be performed before the resin tube 10 is joined. Furthermore, there is no restriction on the method of joining the outer cylinder member 51 and the inner cylinder member 52.

In addition, in the example, the inner cylinder member 52 has the inner cylinder base portion 52b in addition to the inner cylinder 52a. In addition to this, the outer cylinder member 51 may have an outer cylinder base portion (not shown) as a site corresponding to the inner cylinder base portion 52b. In this case, the inner cylinder member 52 is configured only by the inner cylinder 52a, and the inner cylinder member 52 is joined to the outer cylinder base portion of the outer cylinder member 51.

(5. Connection Structure and Connection Method of Third Embodiment)

Figure 3:
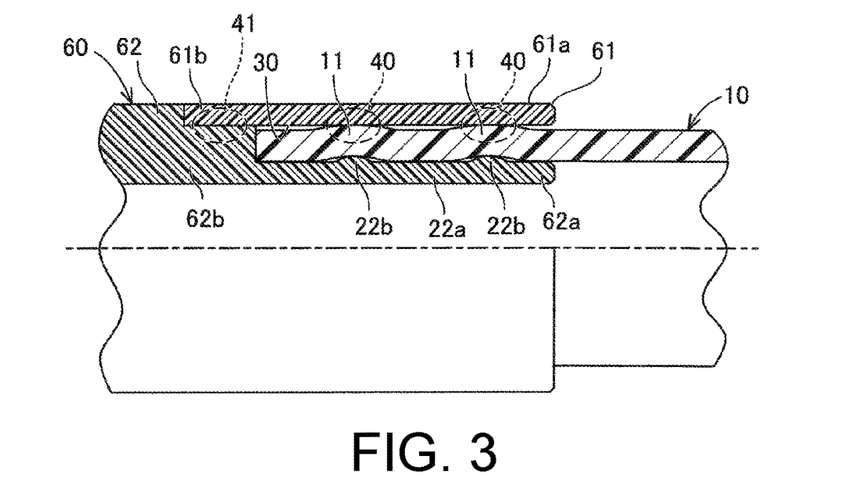
FIG. 3 is a diagram showing a connection structure of a third embodiment, in which the upper half shows an axial cross-section view and the lower half shows a view seen from the outside.

A configuration of a resin joint 60 of a third embodiment is described with reference to FIG. 3. Moreover, in the third embodiment, the same configurations as those in the first embodiment and the second embodiment are designated by the same reference numerals and the description thereof is omitted. The resin joint 60 includes an outer cylinder member 61 and an inner cylinder member 62. The outer cylinder member 61 and the inner cylinder member 62 in the example are separate members, which are molded by different materials respectively, and are joined to each other.

The outer cylinder member 61 is molded by a resin material capable of transmitting laser light. The outer cylinder member 61 includes an outer cylinder 61a and an outer cylinder base portion 61b. The outer cylinder 61a has the same configuration as the outer cylinder 21 of the first embodiment. The outer cylinder base portion 61b is integrally configured at an axial base end (left end in FIG. 3) of the outer cylinder 61a. The outer cylinder base portion 61b configures a part of an axial region of the axial bottom portion of the annular space 30, and is a site extending in the axial direction from the axial base end of the outer cylinder 61a. In the example, the outer cylinder base portion 61b has the same shape as the shape of the cross-section perpendicular to the axis of the outer cylinder 61a.

The inner cylinder member 62 is molded as a separate member from the outer cylinder member 61 and is molded by a resin material different from that of the outer cylinder member 61. The inner cylinder member 62 is formed of a resin material capable of absorbing laser light. The inner cylinder member 62 includes an inner cylinder 62a and an inner cylinder base portion 62b.

The inner cylinder 62a has the same configuration as the inner cylinder 22 of the first embodiment. The inner cylinder base portion 62b is integrally configured at an axial base end (left end in FIG. 3) of the inner cylinder 62a. The inner cylinder base portion 62b configures the axial bottom portion of the annular space 30. In particular, in the example, a notch-shaped step portion is formed at a corner of an outer peripheral surface of the inner cylinder base portion 62b. Besides, at the axial bottom portion of the annular space 30, the inner cylinder base portion 62b is disposed in a state of being in contact with the outer cylinder base portion 61b.

Specifically, the inner peripheral surface of the outer cylinder base portion 61b is in contact with the outer peripheral surface of the inner cylinder base portion 62b. In particular, the inner peripheral surface of the outer cylinder base portion 61*b* is in contact with the outer peripheral surface of the step portion of the inner cylinder base portion 62*b*. Furthermore, an axial end surface of the outer cylinder base portion 61*b* is in contact with an axial end surface of the step portion of the inner cylinder base portion 62*b*. Therefore, the outer cylinder member 61 is positioned in the axial direction and the radial direction with respect to the inner cylinder member 62.

Besides, a contact surface 41 of the inner cylinder base portion 62*b* and the outer cylinder base portion 61*b* is laser-welded. Laser welding is performed as follows. First, the outer cylinder base portion 61*b* of the outer cylinder member 61 is fitted to the outer peripheral surface of the inner cylinder base portion 62*b* of the inner cylinder member 62. Then, the inner peripheral surface of the outer cylinder base portion 61*b* and the outer peripheral surface of the inner cylinder base portion 62*b* are brought into contact with each other. In this state, laser light is irradiated from the outer peripheral surface of the outer cylinder base portion 61*b* over the entire circumference to the contact surface 41 where the outer cylinder base portion 61*b* and the inner cylinder base portion 62*b* are in contact with each other (second laser light irradiation step).

Here, the outer cylinder base portion 61*b* is molded by a resin material capable of transmitting laser light. On the other hand, the inner cylinder base portion 62*b* is molded by a resin material capable of absorbing laser light. Therefore, the irradiated laser light passes through the outer cylinder base portion 61*b* and is absorbed by the inner cylinder base portion 62*b*. Thus, heat is generated at a site where the laser light is absorbed. Besides, the contact surface 41 of the outer cylinder base portion 61*b* and the inner cylinder base portion 62*b* is laser-welded. In this way, the resin joint 60 is completed.

After the resin joint 60 is formed, the resin tube 10 and the resin joint 60 are connected by the same method as the connection method of the first embodiment. In this way, a connection structure of the resin tube 10 and the resin joint 60 is completed.

Moreover, in the example, the outer cylinder 61*a* has a shape in which the outer cylinder base portion 61*b* is extended in the axial direction, the inner cylinder base portion 62*b* is formed thicker than the inner cylinder 62*a*, and the inner cylinder base portion 62*b* configures the axial bottom portion of the annular space 30. In addition to this, the inner cylinder base portion 62*b* may have a shape in which the inner cylinder 62*a* is extended in the axial direction, the outer cylinder base portion 61*b* may be formed thicker than the outer cylinder 61*a*, and the outer cylinder base portion 61*b* may configure the axial bottom portion of the annular space 30.

In addition, other than the above connection method, the following method can also be used. The outer cylinder member 61 and the inner cylinder member 62 that configure the resin joint 60 are not joined in advance before the insertion of the resin tube 10, but are left in a separate state. That is, the outer cylinder member 61, the inner cylinder member 62, and the resin tube 10, which are separate bodies, are disposed so as to come into the state shown in FIG. 3 in a state of being not joined to each other. Thereafter, by irradiating the laser light, the resin tube 10 and the outer cylinder 61*a* are welded, and the outer cylinder base portion 61*b* and the inner cylinder base portion 62*b* are welded. Even in this connection method, the above-described connection structure can also be formed as described above.

(5. Connection Structure and Connection Method of Fourth Embodiment)

Figure 4:
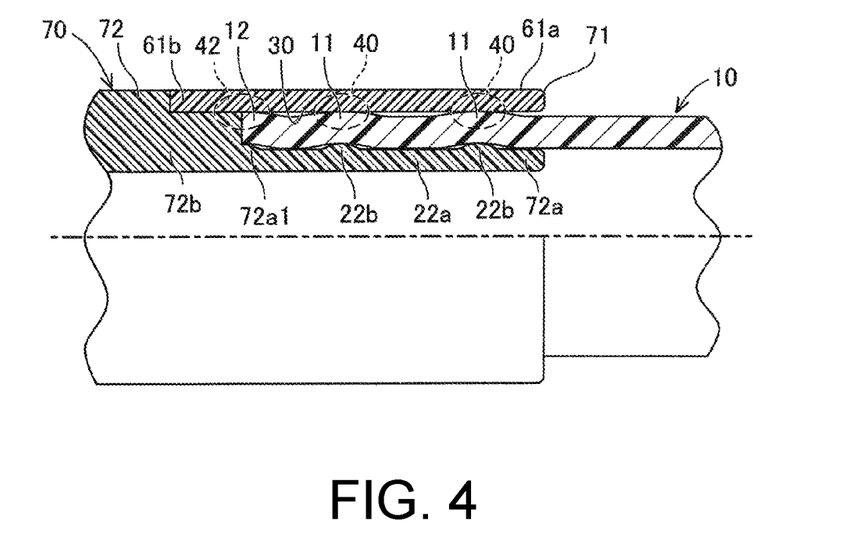
FIG. 4 is a diagram showing a connection structure of a fourth embodiment, in which the upper half shows an axial cross-section view and the lower half shows a view seen from the outside.

A configuration of a resin joint 70 of a fourth embodiment is described with reference to FIG. 4. Moreover, in the fourth embodiment, the same configurations as those in the first embodiment, the second embodiment, and the third embodiment are designated by the same reference numerals and the description thereof is omitted. The resin joint 70 includes an outer cylinder member 71 and an inner cylinder member 72. The outer cylinder member 71 and the inner cylinder member 72 in the example are separate members, which are molded by different materials respectively, and are joined to each other. Here, the outer cylinder member 71 has the same configuration as the outer cylinder member 61 of the third embodiment.

The inner cylinder member 72 is molded as a separate member from the outer cylinder member 71 and is molded by a resin material different from that of the outer cylinder member 71. The inner cylinder member 72 is molded by a resin material capable of absorbing laser light. The inner cylinder member 72 includes an inner cylinder 72*a* and an inner cylinder base portion 72*b*.

The inner cylinder 72*a* further includes a base end annular protrusion 72*a*1 with respect to the inner cylinder 22 of the first embodiment. The base end annular protrusion 72*a*1 is formed on the axial bottom portion side of the annular space 30 on the outer peripheral surface of the inner cylinder body 22*a*, and protrudes further outward in the radial direction than the inner cylinder body 22*a*. The base end annular protrusion 72*a*1 is substantially similar to the annular protrusion 22*b*. The inner cylinder base portion 72*b* has the same configuration as the inner cylinder base portion 62*b* of the third embodiment.

A connection method of the resin tube 10 and the resin joint 70 configured in this way is described. First, the outer cylinder base portion 61*b* of the outer cylinder member 71 is fitted to an outer peripheral surface of the inner cylinder base portion 72*b* of the inner cylinder member 72 that configures the resin joint 70. At this time, the inner cylinder base portion 72*b* and the outer cylinder base portion 61*b* are not joined.

Subsequently, the resin tube 10 is inserted into the annular space 30 formed by the outer cylinder 61*a* and the inner cylinder 72*a* at the axial end of the resin tube 10. The resin tube 10 passes through the annular protrusion 22*b*, and furthermore a forefront end 12 of the resin tube 10 reaches the base end annular protrusion 72*a*1. Then, the forefront end 12 of the resin tube 10 is deformed in the radial direction following the base end annular protrusion 72*a*1. Similar to the region of the annular protrusion 22*b* in the resin tube 10, the forefront end 12 of the resin tube 10 is in a state of being compressed and deformed in the thickness direction by the base end annular protrusion 72*a*1 and the outer cylinder 61*a*.

In this state, in a region 42, an outer peripheral surface of a forefront end 12 of the resin tube 10 is in contact with an inner peripheral surface of the outer cylinder 61*a*, and an axial end surface of the forefront end 12 of the resin tube 10 is in contact with an axial end surface of the inner cylinder base portion 72*b*. Furthermore, in the region 42, the inner peripheral surface of the outer cylinder base portion 61*b* and the outer peripheral surface of the inner cylinder base portion 72*b* are in contact with each other.

Subsequently, the laser light is irradiated to the region 42 (third laser light irradiation step). The outer cylinder member 71 is molded by a resin material capable of transmitting laser light. On the other hand, the resin tube 10 and the inner cylinder base portion 62*b* are molded by a resin material capable of absorbing laser light. Therefore, the irradiated laser light passes through the outer cylinder member 71 and is absorbed by the forefront end 12 of the resin tube 10 and the inner cylinder base portion 62b. Then, the region 42 where the outer cylinder member 71, the inner cylinder member 72, and the resin tube 10 are in contact with each other is laser-welded. That is, in the region 42, the forefront end 12 of the resin tube 10, the inner cylinder base portion 62b, and the outer cylinder member 71 are laser-welded to each other.

In addition, as in the first embodiment, the contact site 40 between the target region 11 of the resin tube 10 and the inner peripheral surface of the outer cylinder 61a is laser-welded. Moreover, either the laser welding of the contact site 40 or the laser welding of the region 42 may be performed first.

7. Fifth Embodiment (7-1. Configuration of Resin Joint 80 of Fifth Embodiment)
A configuration of a resin joint 80 of a fifth embodiment is described with reference to FIG. 5. In addition, in the fifth embodiment, the same configurations as those in the first embodiment are designated by the same reference numerals and the description thereof is omitted. The resin joint 80 includes an outer cylinder 81 and an inner cylinder 82. Similarly as in the first embodiment, the outer cylinder 81 and the inner cylinder 82 are molded by a resin material of the same type and configure one member formed integrally. However, the outer cylinder 81 and the inner cylinder 82 may also be separate members as in the second to fourth embodiments.

Figure 5:
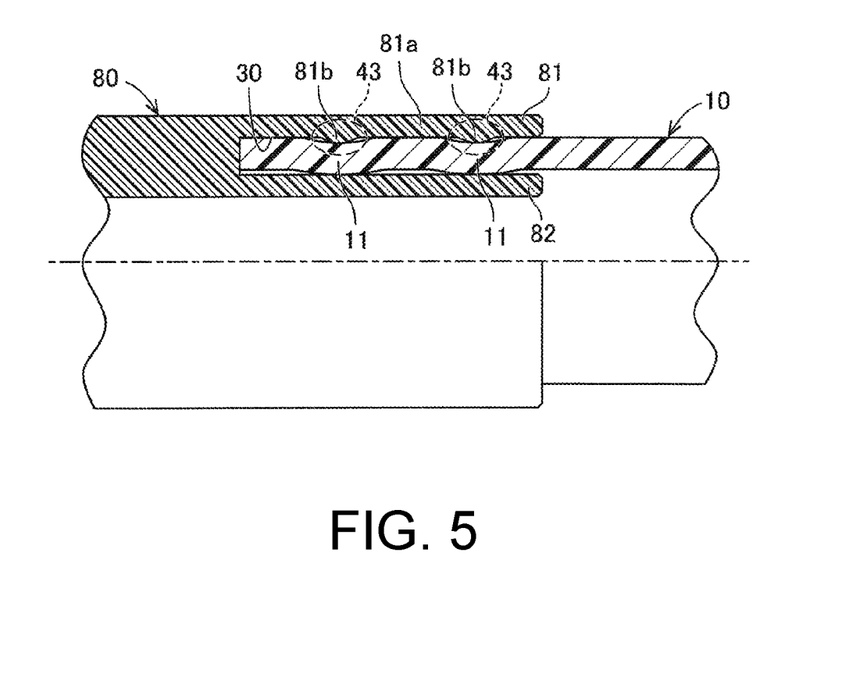
FIG. 5 is a diagram showing a connection structure of a fifth embodiment, in which the upper half shows an axial cross-section view and the lower half shows a view seen from the outside.

Here, in the above examples, the annular protrusion 22b is formed on the inner cylinders 22, 52a, 62a, and 72a. In the example, an annular protrusion 81b is formed on the outer cylinder 81.

The outer cylinder 81 is molded by a resin material capable of transmitting laser light. The outer cylinder 81 includes an outer cylinder body 81a and one or more annular protrusions 81b. An inner peripheral surface of the outer cylinder body 81a is formed into a shape substantially similar to the outer peripheral surface of the resin tube 10. The annular protrusion 81b is formed on the inner peripheral surface of the outer cylinder body 81a and protrudes further inward in the radial direction than the outer cylinder body 81a. The annular protrusion 81b is formed in a manner of extending along the entire circumference of the outer cylinder body 81a in the circumferential direction. Moreover, details of the annular protrusion 81b are substantially similar to those of the annular protrusion 22b in the first embodiment. The inner cylinder 82 is formed by a part corresponding to the outer cylinder body 22a of the first embodiment.

(7-2. Connection Structure and Connection Method of Fifth Embodiment)
Next, a connection structure and a connection method of the resin tube 10 and the resin joint 80 described above is described with reference to FIG. 5.

The axial end of the resin tube 10 is inserted into the annular space 30 formed in the resin joint 80 (initial insertion step). Then, when the resin tube 10 is inserted deep inside, the resin tube 10 passes through the one or more annular protrusions 81b (annular protrusion passing step). Then, the front end of the resin tube 10 in the radial direction reaches the bottom surface of the annular space 30.

Here, in an axial region where the annular protrusion 81b is formed, the target region 11 of the resin tube 10 is deformed in the radial direction following the annular protrusion 81b. A difference between inner diameter of the annular protrusion 81b at a position in which the annular protrusion 81b has the maximum height and an outer diameter of the outer peripheral surface of the inner cylinder 82 is formed to be smaller than the reference thickness (no-load thickness) of the resin tube 10. Thus, in the axial region where the annular protrusion 81b is formed, the target region 11 of the resin tube 10 is in a state of being compressed and deformed in the thickness direction.

In addition, a region of the outer peripheral surface of the inner cylinder 82 which faces the annular protrusion 81b acts as a support surface for restricting concave deformation caused by a part of the resin tube 10 in the circumferential direction (buckling in the circumferential direction) when the resin tube 10 passes through the annular protrusion 81b. Therefore, the target region 11 deformed in the radial direction by the annular protrusion 81b in the resin tube 10 is in a state of being compressed in the radial direction over the entire circumference by the annular protrusion 81b in the resin joint 80 and the outer peripheral surface of the inner cylinder 82 which is the facing surface of the annular protrusion 81b.

As a result, the target region 11 deformed in the radial direction in the resin tube 10 has a surface of the inner peripheral surface of the outer cylinder 81 which is in contact with the annular protrusion 81b over the entire circumference. In particular, because the target region 11 of the resin tube 10 is in a state of being compressed in the radial direction by the annular protrusion 81b and the outer peripheral surface of the inner cylinder 82 which is the facing surface of the annular protrusion 81b, the target region 11 of the resin tube 10 is reliably in contact with the inner peripheral surface of the annular protrusion 81b of the outer cylinder 81 over the entire circumference.

Subsequently, laser light is irradiated from the outer peripheral surface of the outer cylinder 81 over the entire circumference to the surface where the inner peripheral surface of the annular protrusion 81b of the outer cylinder 81 and the outer peripheral surface of the target region 11 of the resin tube 10 are in contact with each other in an axial region of the annular protrusion 81b (laser light irradiation step). The outer cylinder 81 is molded by a resin material capable of transmitting the laser light. On the other hand, the resin tube 10 is molded by a resin material capable of absorbing the laser light.

Therefore, the irradiated laser light passes through the outer cylinder 81 and is absorbed by the resin tube 10. Thus, heat is generated at a site where the laser light is absorbed. In the site where the laser light is absorbed, the inner peripheral surface of the annular protrusion 81b of the outer cylinder 81 is firmly in contact with the outer peripheral surface of the target region 11 of the resin tube 10. Therefore, a contact site 43 between the inner peripheral surface of the annular protrusion 81b of the outer cylinder 81 and the outer peripheral surface of the target region 11 of the resin tube 10 is laser-welded in the axial region of the annular protrusion 81b by the irradiation of the laser light. In this way, the connection structure of the resin tube 10 and the resin joint 80 is completed.

What is claimed is:
1. A connection structure of a resin tube and a resin joint, where
the resin joint comprises:
an outer cylinder molded from a resin material capable of transmitting laser light, and
an inner cylinder molded from a resin material that is disposed facing an inner peripheral surface of the outer cylinder and forms an annular space between the inner peripheral surface of the outer cylinder and an outer peripheral surface of the inner cylinder, the annular space having an opening in one side in the axial direction for receiving an axial end of the resin tube;

wherein two or more annular protrusions that protrude in a radial direction and extend along an entire circumferential direction are formed in the annular space on the inner peripheral surface of the outer cylinder or the outer peripheral surface of the inner cylinder, the two or more annular protrusions having heights in the radial direction which are the same, axial cross-section shapes which are the same, and being spaced apart from one another in the axial direction by a portion of the inner peripheral surface of the outer cylinder or outer peripheral surface of the inner cylinder which is a linear shape parallel to the axial direction;

where the axial end of the resin tube is molded from a resin material capable of absorbing laser light;

wherein the axial end of the resin tube is inserted into the annular space and is deformed and compressed in the radial direction following the annular protrusions such that regions of the axial end of the resin tube have surfaces that are in contact with and compressed against the inner peripheral surface of the outer cylinder, and wherein the inner peripheral surface of the outer cylinder and the surfaces of the axial end of the resin tube in contact with and compressed against the inner peripheral surface of the outer cylinder are laser-welded;

where a difference between an inner diameter of the inner peripheral surface of the outer cylinder and an outer diameter of the annular protrusions formed on the outer peripheral surface of the inner cylinder is smaller than a reference thickness of the resin tube, wherein the reference thickness is a no-load thickness of the resin tube prior to insertion into the annular space, and wherein the outer diameter of the annular protrusions is from a maximum height of the annular protrusions, or a difference between an outer diameter of the outer peripheral surface of the inner cylinder and an inner diameter of the annular protrusions formed on the inner peripheral surface of the outer cylinder is smaller than the reference thickness of the resin tube, wherein the inner diameter of the annular protrusions is from a maximum height of the annular protrusions; and where the resin material of the outer cylinder and the resin material of the inner cylinder both have a higher hardness than the axial end of the resin tube.

2. The connection structure of claim 1, wherein the two or more annular protrusions are formed on the outer peripheral surface of the inner cylinder, and wherein the axial cross section of the inner peripheral surface of the outer cylinder is formed into a linear shape parallel to the axial direction.

3. The connection structure of claim 1, wherein the two or more annular protrusions are formed on the inner peripheral surface of the outer cylinder, and wherein the axial cross section of the outer peripheral surface of the inner cylinder is formed into a linear shape parallel to the axial direction.

4. The connection structure of claim 1, wherein the resin material of the outer cylinder and the resin material of the inner cylinder are the same, and the outer cylinder and the inner cylinder are integrally molded from the resin material.

5. The connection structure of claim 1, wherein the resin material of the outer cylinder and the resin material of the inner cylinder are different.

6. The connection structure of claim 5, wherein the resin joint further comprises:

an outer cylinder member including the outer cylinder, and an inner cylinder member including the inner cylinder and being joined to the outer cylinder member;

wherein the outer cylinder member is molded from a resin material capable of transmitting laser light;

wherein the inner cylinder member is molded from a resin material capable of absorbing laser light;

where at an axial bottom portion of the annular space, the inner cylinder member is in contact with the outer cylinder member, and wherein a contact surface between the inner cylinder member and the outer cylinder member is laser-welded.

7. The connection structure of claim 6, wherein at the axial bottom portion of the annular space, the outer cylinder member, the inner cylinder member, and the resin tube are in contact with each other and are laser-welded.

8. The connection structure of claim 1, wherein the resin tube has a multi-layer structure, and at least one of the multiple layers is molded from a resin material capable of absorbing laser light.

9. The connection structure of claim 8, wherein the connection structure is a fuel supply line of an automobile.

* * * * *